United States Patent Office 2,794,805
Patented June 4, 1957

2,794,805
VAT DYESTUFFS DERIVED FROM PERYLENE TETRACARBOXYLIC ACID DIIMIDE

Wilhelm Schmidt-Nickels, Little York, N. J., assignor to General Aniline & Film Corporation, New York, N. Y., a corporation of Delaware No Drawing. Application December 29, 1955, Serial No. 556,099

8 Claims. (Cl. 260—281)

This invention relates to new vat dyestuffs of the perylene series and to their preparation.

More particularly, the invention relates to N,N'-bis-(beta-cyanoethyl)perylene-3,4,9,10-tetracarboxylic acid diimide having the following formula:

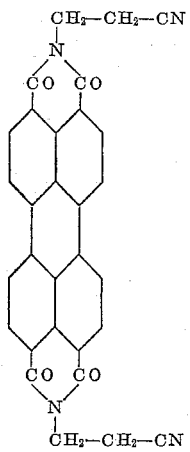

and the nuclear halo- (bromo- or chloro-) and amino-substituted derivatives thereof.

The dyestuffs of this invention yield gray shades on cellulosic materials when applied thereto from an alkaline hydrosulfite vat with subsequent development under oxidizing conditions on the fiber.

Preparation of the dyestuffs of the invention can be carried out by condensing a perylene-3,4,9,10-tetra-carboxylic acid diimide with 2 mols of acrylonitrile in the presence of an organic quaternary ammonium base (e. g., trimethylphenyl ammonium hydroxide or tetra-ethanol ammonium hydroxide). Alternatively, the dyestuffs can be made by condensing the corresponding perylene-3,4,9,10-tetracarboxylic acid anhydride with beta-aminopropionitrile or with imino-bis-beta,beta'-propionitrile, whereby water is eliminated in the first reaction, and water, together with acrylonitrile is eliminated in the second reaction, yielding the N,N'-bis(beta-cyanoethyl)perylene-3,4,9,10-tetracarboxylic acid diimides of the invention.

Instead of unsubstituted perylene intermediates, nuclear substituted derivatives, containing, for example, chlorine, bromine, or amino groups, can be used to obtain corresponding nuclear substituted dyestuffs. Preparation of the dyestuffs of the invention which contain nuclear substituents is preferably carried out by condensing the corresponding perylene-3,4,9,10-tetracarboxylic acid anhydrides with either beta-aminopropionitrile or imino-bis-beta,beta'-propionitrile.

The invention will be more fully understood from the following examples, wherein parts and percentages are by weight:

Example 1

A mixture of 80 parts of acrylonitrile with 10 parts of perylene-3,4,9,10-tetracarboxylic acid diimide and 4 parts of aqueous 20% trimethylphenyl ammonium hydroxide was heated under reflux while agitating at 75–80° C. for 1½ hours. After cooling, the mixture was filtered and the filter cake washed successively with ethanol and water and then dried. 9.5 parts of N,N'-bis-(beta-cyanoethyl)perylene - 3,4,9,10 - tetracarboxylic acid diimide was thus recovered as a filter cake, amounting to a yield of 75% of theory. This product forms a violet alkaline hydrosulfite vat which produces brownish gray shades when applied to cotton goods and developed under oxidizing conditions. The dyeings are characterized by very good fastness to chlorine, washing and light.

Example 2

28 parts beta-aminopropionic acid were mixed with 7.8 parts of perylene-3,4,9,10-tetracarboxylic acid anhydride, and the mixture heated under reflux with agitation at 80° C. for 2 hours. After cooling to room temperature, the reaction mixture was slurried successively with 2 portions of ethanol, each amounting to 80 parts, and the insoluble product recovered by filtration and washed on the filter with ethanol. The N,N'-bis(beta-cyanoethyl)perylene-3,4,9,10-tetracarboxylic acid diimide, obtained in a yield corresponding to 91% of theory, exhibited dyeing properties identical with those of the product of Example 1.

Example 3

29.5 parts of imino-bis-beta,beta'-propionitrile were mixed with 7.8 parts of perylene-3,4,9,10-tetracarboxylic acid anhydride and the mixture heated with agitation under reflux for 45 minutes at 230° C. After cooling to room temperature, the reaction mixture was slurried with 300 parts of water at 75° C. for 2 hours and the insoluble material, after recovery by filtration, was boiled with 525 parts of aqueous 5% sodium carbonate solution, then filtered, the cake washed with water, and dried. N,N'-bis(beta-cyanoethyl)perylene-3,4,9,10-tetracarboxylic acid diimide was thus obtained in a yield corresponding to 89% of theory.

Example 4

Perylene-3,4,9,10-tetracarboxylic acid diimide was chlorinated in accordance with the method described in German Patent 441,587 and saponified in accordance with the procedure of German Patent 394,794 to yield trichloroperylenetetracarboxylic acid anhydride. 3.8 parts of this compound were mixed with 20 parts of beta-aminopropionitrile, whereby the temperature rose spontaneously to 35° C. and then gradually dropped to 31° C. over a period of 20 minutes. The mixture was then agitated at room temperature for 15 hours. 80 parts of ethanol were then added, and the mixture heated to boiling under reflux for 15 minutes and filtered hot. The filter cake was washed with alcohol, then with water, and then dried. 3.0 parts of trichloro-N,N'-bis(beta-cyanoethyl)-3,4,9,10-tetracarboxylic acid diimide were recovered in this manner, corresponding to a yield of 66% of theory. The dyestuff yielded a violet alkaline hydrosulfite vat from which cotton was dyed in reddish brown shades upon development of the coloration under oxidizing conditions.

Example 5

3.1 parts of monoaminoperylene-3,4,9,10-tetracarboxylic acid anhydride and 10.8 parts of beta-aminopropionitrile were mixed and heated under reflux for 2 hours at a temperature of 100° C. After cooling, the mixture was diluted with 100 parts of water, the resulting slurry filtered and the filter cake dried. 2.7 parts of monoamino - N,N' - bis(beta - cyanoethyl)perylene - 3,4,9,10-tetracarboxylic acid diimide were obtained in this manner, and amounted to 69% of theory. The product yielded a blue alkaline hydrosulfite vat from which cotton was dyed in greenish gray shades, after development on the fiber under oxidizing conditions. Monoaminoperylene-3,4,9,10-tetracarboxylic acid anhydride can be prepared by nitrating perylene-3,4,9,10-tetracarboxylic acid anhydride in a mixture of concentrated sulfuric and nitric acids and reduction of the resulting mononitroperylene-3,4,9,10-tetracarboxylic acid diimide with metallic tin and hydrochloric acid.

*Example 6*

5.5 parts of monoaminoperylene-3,4,9,10-tetracarboxylic acid anhydride of Example 5 and 20 parts of iminobis-beta,beta'-propionitrile were mixed and agitated and heated gradually under reflux over a period of 25 minutes to 230° C. This temperature was maintained for 15 minutes, and the mixture then allowed to cool to room temperature. 200 parts of water were added, and the mixture slurried for 2 hours at 75° C. The slurry was then filtered while hot, and the cake washed with water and then boiled with 420 parts of an aqueous 5% sodium carbonate solution. The slurry was again filtered, and the cake washed with water and dried. Monoaminobis - N,N' - (beta - cyanoethyl)perylene-3,4,9,10-tetracarboxylic acid diimide was thus obtained, having properties identical with those of the product of Example 5.

The perylene intermediates employed in the preparation of the dyestuffs of this invention can be unsubstituted perylene-3,4,9,10-tetracarboxylic acid anhydride or -diimide, or the corresponding nuclear chloro-, bromo-, or amino-substituted compounds.

The cyanoethylating reagent (acrylonitrile in the case of perylene-3,4,9,10-tetracarboxylic acid diimides, and either beta-aminopropionitrile or imino-bis-beta,beta'-propionitrile in the case of perylene-3,4,9,10-tetracarboxylic acid anhydride) is employed in substantial excess (e. g., 3–10 times the weight) of the aforesaid perylene intermediate.

Reaction of acrylonitrile with the aforesaid diimide is effected in the presence of a quaternary ammonium base, such as tetraethanol ammonium hydroxide or trimethylphenyl ammonium hydroxide, suitably in amounts of 0.5–10% by weight of the reaction mixture.

Preferred reaction temperatures depend upon the nature of the reagents. Thus, for condensation of acrylonitrile with perylene-3,4,9,10-tetracarboxylic acid diimides, in the presence of a quaternary ammonium hydroxide, the reaction mixture is preferably maintained at 50–100° C. In condensing beta-aminopropionitrile with a perylene-3,4,9,10-tetracarboxylic acid anhydride, the temperature can range from room temperature (about 25° C.) to about 100° C. In the case of a condensation of imino-bis-beta-beta'-propionitrile, the temperature is preferably maintained at 180–250° C.

Duration of the reaction is greater or less as the temperature is lowered or raised. Thus, at room temperature, condensation of beta-aminopropionitrile with perylene-3,4,9,10-tetracarboxylic acid anhydride requires 10–20 hours, while condensation at 180–250° C. of imino-bis-beta,beta'-propionitrile with perylene-3,4,9,10-tetracarboxylic acid anhydride requires ½–1½ hours. Intermediate between these reactions is the condensation of perylene-3,4,9,10-tetracarboxylic acid diimide with acrylonitrile or of perylene-3,4,9,10-tetracarboxylic acid anhydride with beta-aminopropionitrile at 50–100° C., which requires 1–4 hours.

The dyestuffs of the invention can be readily recovered from the completed reaction mixture by treatment with water or dilute aqueous alkali metal carbonate to dissolve out accompanying byproducts and unreacted materials, followed by filtration to separate the insoluble dyestuff.

Variations and modifications, which will be obvious to those skilled in the art, can be made in the procedures herein described and illustrated without departing from the scope or spirit of the invention.

I claim:

1. A vat dyestuff of the class consisting of N,N'-bis-(beta - cyanoethyl)perylene-3,4,9,10-tetracarboxylic acid diimide and its nuclear chloro-, bromo-, and amino-substituted derivatives.

2. N,N'-bis(beta-cyanoethyl)perylene-3,4,9,10-tetracarboxylic acid diimide.

3. Trichloro - N,N' - bis(beta - cyanoethyl)perylene-3,4,9,10-tetracarboxylic acid diimide.

4. Monoamino - N,N' - bis(beta - cyanoethyl)perylene-3,4,9,10-tetracarboxylic acid diimide.

5. A process for the preparation of a vat dyestuff of the perylene series which comprises reacting a member of the class consisting of perylene-3,4,9,10-tetracarboxylic acid anhydride and -diimide and their nuclear chloro-, bromo-, and amino-substituted derivatives, with a cyanoethylating agent therefor of the class consisting of acrylonitrile, beta-aminopropionitrile, and imino-bis-beta,beta'-propionitrile, by heating a mixture of the agitated reagents at condensation temperature and separating the resulting condensation product from the reaction mixture.

6. A process for the preparation of an N,N'-bis(beta-cyanoethyl)perylene-3,4,9,10-tetracarboxylic acid diimide, which comprises heating a perylene-3,4,9,10-tetracarboxylic acid diimide with 3–10 times its weight of acrylonitrile in the presence of a quaternary ammonium hydroxide amounting to 0.5–10% by weight of the reaction mixture at a temperature from 50–100° C., and separating the resulting condensation product from the reaction mixture.

7. A process for the preparation of an N,N'-bis(beta-cyanoethyl)perylene-3,4,9,10-tetracarboxylic acid diimide, which comprises heating a perylene-3,4,9,10-tetracarboxylic acid anhydride with 3–10 times its weight of beta-iminopropionitrile at a temperature of 25–100° C., and separating the resulting condensation product from the reaction mixture.

8. A process for the preparation of an N,N'-bis(beta-cyanoethyl)perylene-3,4,9,10-tetracarboxylic acid diimide, which comprises heating a perylene-3,4,9,10-tetracarboxylic acid anhydride with 3–10 times its weight of imino-bis-beta,beta'-propionitrile at a temperature of 180–250° C. and separating the resulting condensation product from the reaction mixture.

No references cited.